(12) United States Patent
Chen et al.

(10) Patent No.: US 10,110,914 B1
(45) Date of Patent: Oct. 23, 2018

(54) LOCALLY ADAPTIVE WARPED MOTION COMPENSATION IN VIDEO CODING

(71) Applicant: GOOGLE INC., Mountain View, CA (US)

(72) Inventors: Yue Chen, Sunnyvale, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 107 days.

(21) Appl. No.: 15/266,480

(22) Filed: Sep. 15, 2016

(51) Int. Cl.
*H04N 19/13* (2014.01)
*H04N 19/52* (2014.01)
*H04N 19/176* (2014.01)
*H04N 19/182* (2014.01)
*H04N 19/184* (2014.01)

(52) U.S. Cl.
CPC .......... *H04N 19/52* (2014.11); *H04N 19/176* (2014.11); *H04N 19/182* (2014.11); *H04N 19/184* (2014.11)

(58) Field of Classification Search
CPC ...... H04N 7/50; H04N 7/26244; H04N 5/145; H04N 7/26765; H04N 7/26015
USPC .................................................. 375/240.16
See application file for complete search history.

(56) References Cited

U.S. PATENT DOCUMENTS

| 8,363,721 B2 | 1/2013 | Tian et al. | |
| 2006/0028350 A1* | 2/2006 | Bhai | A61B 5/1115 340/666 |
| 2007/0255115 A1* | 11/2007 | Anglin, Jr. | G06F 19/00 600/300 |
| 2008/0240247 A1 | 10/2008 | Lee et al. | |
| 2009/0046995 A1* | 2/2009 | Kanumuri | G06T 3/4053 386/328 |
| 2009/0119843 A1* | 5/2009 | Rodgers | A61B 5/1115 5/611 |
| 2009/0164917 A1* | 6/2009 | Kelly | G06F 3/011 715/757 |
| 2010/0217619 A1* | 8/2010 | Cox | G06F 19/3418 705/2 |
| 2010/0299618 A1* | 11/2010 | Pare | A63F 13/12 715/757 |

(Continued)

OTHER PUBLICATIONS

Lainema et al, Intra coding of the HEVC Standard (Year: 2012).*

(Continued)

*Primary Examiner* — Shan E Elahi
(74) *Attorney, Agent, or Firm* — Young Basile Hanlon & MacFarlane, P.C.

(57) ABSTRACT

Encoding or decoding blocks of video frames using locally adaptive warped motion compensation can include determining projection samples for predicting a warped motion of a current block to be encoded or decoded based on a warping model of a neighbor block adjacent to the current block. Parameters of a projection model can be determined based on the projection samples. A prediction block can be generated by projecting pixels of the current block to a warped patch within a reference frame using the parameters of the projection model. The warped patch can be a non-rectangular patch having a shape and a position in the reference frame indicated by the parameters of the projection model.

17 Claims, 8 Drawing Sheets

(56) References Cited

U.S. PATENT DOCUMENTS

| | | | | |
|---|---|---|---|---|
| 2013/0034171 | A1* | 2/2013 | Winken | H04N 19/597 375/240.25 |
| 2013/0039423 | A1* | 2/2013 | Helle | H04N 19/197 375/240.13 |
| 2013/0300573 | A1* | 11/2013 | Brown | A61B 5/1113 340/870.01 |
| 2014/0301475 | A1* | 10/2014 | Guo | H04N 19/50 375/240.24 |
| 2015/0341674 | A1* | 11/2015 | Seregin | H04N 19/105 375/240.12 |
| 2015/0373325 | A1* | 12/2015 | Karczewicz | H04N 19/593 375/240.13 |
| 2016/0255352 | A1* | 9/2016 | Pu | H04N 19/94 375/240.24 |
| 2018/0070105 | A1* | 3/2018 | Jin | H04N 19/577 |

OTHER PUBLICATIONS

Huang et al, Adaptive early jump-out technique for fast motion estimation in video coding (Year: 1996).*
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Shiwei Li et al.; "Dual-Feature Warping-based Motion Model Estimation"; ICCV paper, provided by the Computer Vision Foundation; 2015; pp. 4283-4291.
Wiegand, Thomas; "Affine Multipicture Motion-Compensated Prediction"; IEE Transactions on Circuits and Systems for Video Technology, vol. 15, No. 2, Feb. 2, 2005; pp. 197-209.

* cited by examiner

LOCALLY ADAPTIVE WARPED MOTION COMPENSATION IN VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to encoding and decoding blocks of video frames using locally-adaptive warped motion compensation.

An apparatus for encoding a block of a video frame according to one implementation of the disclosure comprises a processor configured to execute instructions stored in a non-transitory storage medium to determine projection samples for predicting a warped motion of a current block to be encoded based on a warping model of a neighbor block adjacent to the current block, the current block located within the video frame. The processor is further configured to execute instructions stored in the non-transitory storage medium to determine parameters of a projection model based on the projection samples. The processor is further configured to execute instructions stored in the non-transitory storage medium to generate a prediction block by projecting pixels of the current block to a warped patch within a reference frame using the parameters of the projection model, the warped patch being a non-rectangular patch having a shape and a position in the reference frame indicated by the parameters of the projection model. The current block is encodable using the prediction block.

An apparatus for decoding a block of an encoded video frame according to one implementation of the disclosure comprises a processor configured to execute instructions stored in a non-transitory storage medium to determine projection samples for predicting a warped motion of a current block to be decoded based on a warping model of a neighbor block adjacent to the current block, the current block located within the encoded video frame. The processor is further configured to execute instructions stored in the non-transitory storage medium to determine parameters of a projection model based on the projection samples. The processor is further configured to execute instructions stored in the non-transitory storage medium to generate a prediction block by projecting pixels of the current block to a warped patch within a reference frame using the parameters of the projection model, the warped patch being a non-rectangular patch having a shape and a position in the reference frame indicated by the parameters of the projection model. The current block is decodable using the prediction block.

A method for decoding a block of an encoded video frame according to another aspect of the disclosure comprises determining projection samples for predicting a warped motion of a current block to be decoded based on a warping model of a neighbor block adjacent to the current block, the current block located within the encoded video frame. The method further comprises determining parameters of a projection model based on the projection samples. The method further comprises generating a prediction block by projecting pixels of the current block to a warped patch within a reference frame using the parameters of the projection model, the warped patch being a non-rectangular patch having a shape and a position in the reference frame indicated by the parameters of the projection model. The current block is decodable using the prediction block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression schemes use regular motion compensation, which assumes purely translational motion between or within blocks, to predict the motion within blocks of frames to be encoded or decoded. However, not all motion within a block is purely translational. For example, some motion may include scaling, shearing, or rotating motion, either alone or with translational motion.

Implementations of this disclosure includes using warped motion compensation to generate a prediction block for encoding or decoding individual blocks of a video frame. Projection samples usable for predicting a warped motion of a current block to be encoded can be determined based on warping models of neighbor blocks adjacent to the current block within the video frame. The parameters of a projection model to be used to generate a prediction block can be determined based on the projection samples. The prediction block can then be generated by projecting pixels of the current block to a warped patch within a reference frame using the parameters of the projection model, such that the current block can be encoded or decoded using the prediction block. In some implementations, the warped patch can be a non-rectangular patch having a shape and a position in the reference frame indicated by the parameters of the projection model. Further details of using warped motion compensation to generate a prediction block are described herein with initial reference to a system in which it can be implemented.

Figure 1:
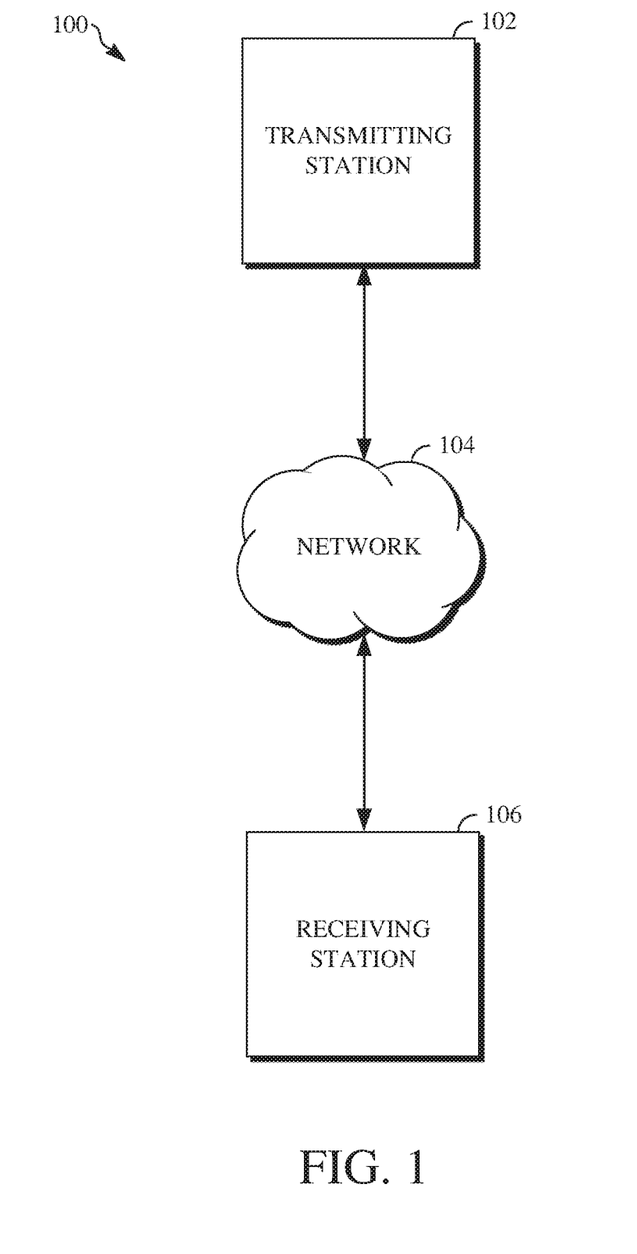
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
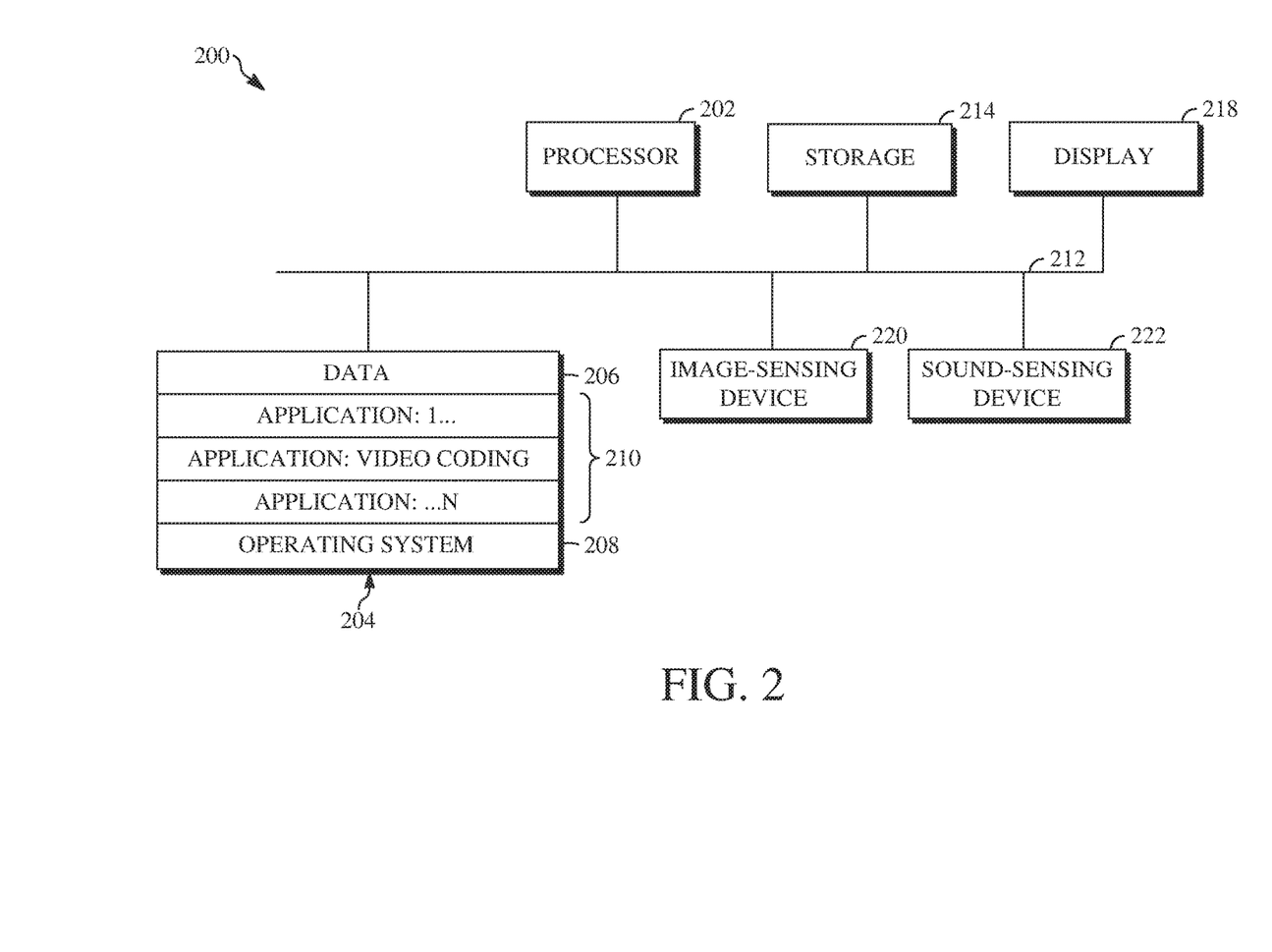
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
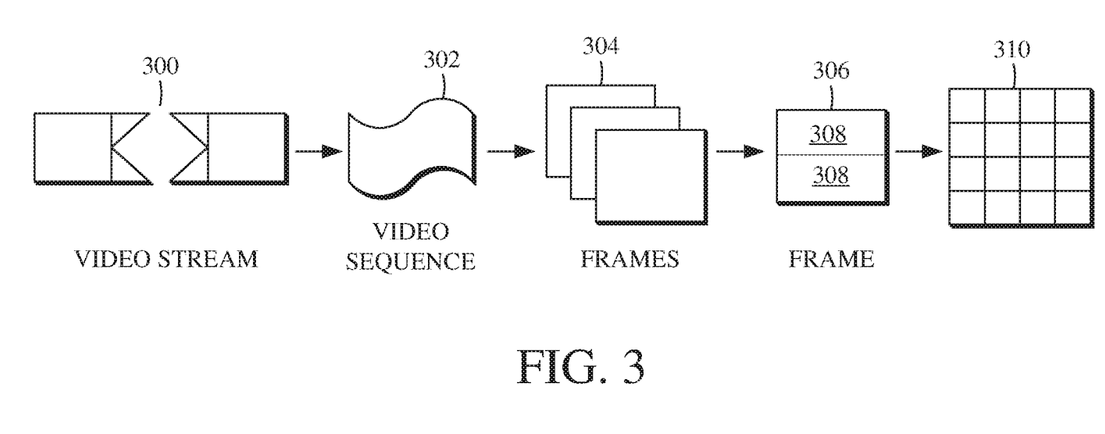
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
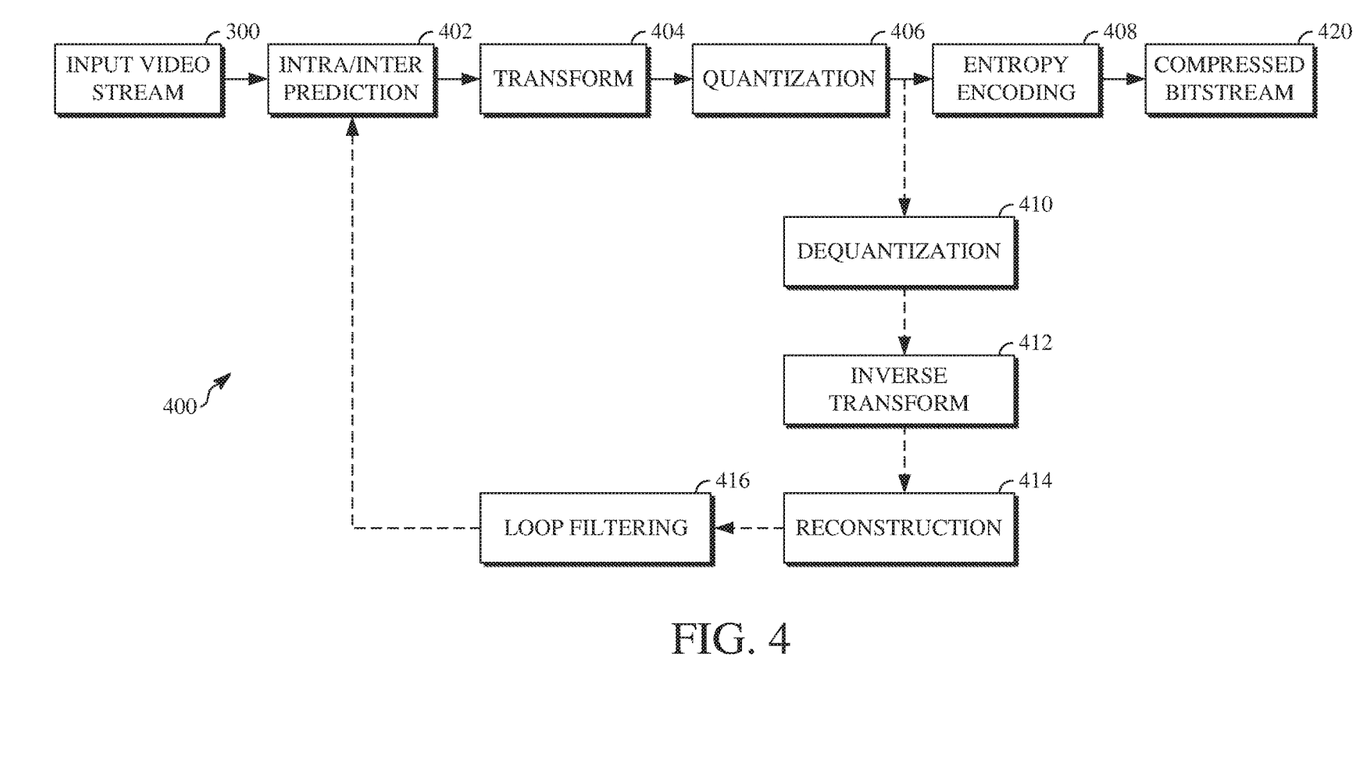
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using warped motion compensation to project pixels of a current block to a warped patch of a reference frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
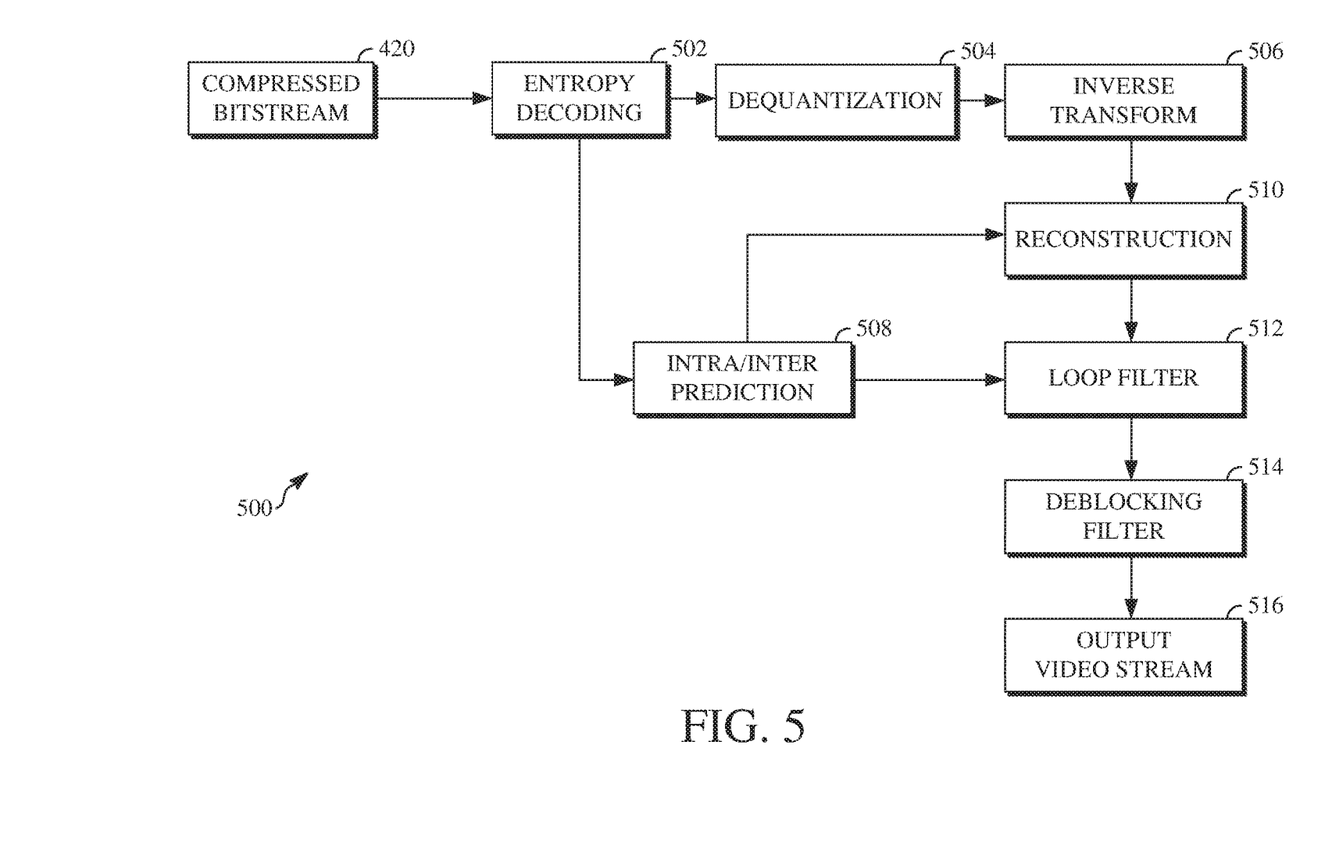
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 are discussed below with respect to FIGS. 6, 7, and 8, for example, using warped motion compensation to project pixels of a current block to a warped patch of a reference frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
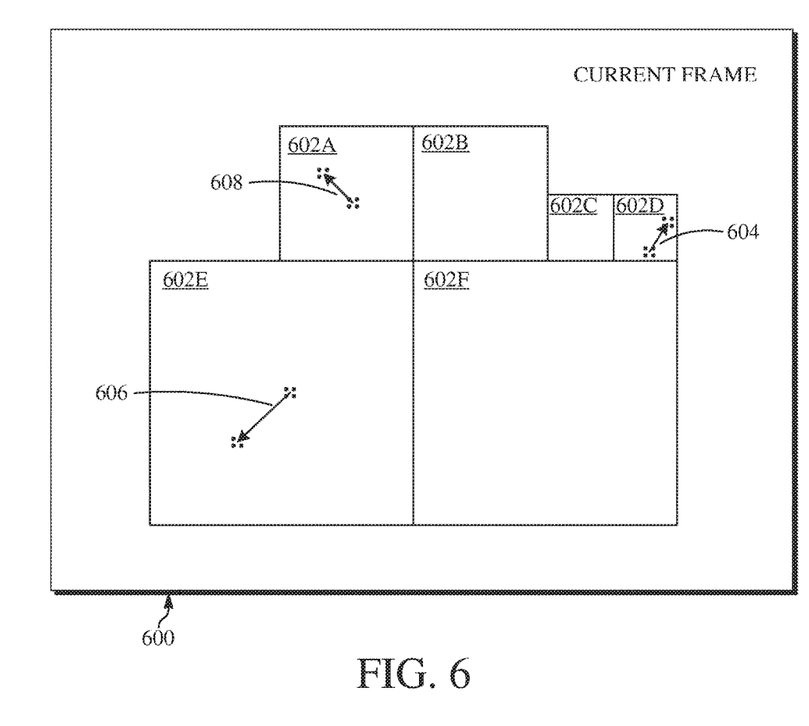
FIG. 6 is a diagram showing an example of pixel projection for blocks of a video frame to be encoded or decoded.

FIG. 6 is a diagram showing an example of pixel projection for blocks of a video frame to be encoded or decoded. A block within a video frame can include warped motion that might not be accurately predicted using motion vectors determined via regular motion compensation (e.g., typical translational inter-prediction). For example, the motion within the block might scale, rotate, or otherwise move in a not entirely linear manner in any number of different directions. Regular motion compensation can miss certain portions of the motion falling outside of the rectangular geometry or use an unnecessary number of bits to predict the motion. As such, a prediction block used to encode or decode the block can be formed, or generated, based on a warping model for the block.

Warped motion compensation can be used to encode or decode the block based on projections of pixels of the block to a reference frame. Warped motion compensation may be referred to herein as locally adaptive warped motion compensation as it is performed on smaller regions than on a frame as a whole, such as on a block basis as described in the examples herein. The projections of the pixels, also referred to as projection samples when describing determining the warped motion of a block, show how pixels of the block scale, rotate, or otherwise move. In some implementations, the projection samples can be estimated using previously encoded or decoded projection samples for one or more from neighbor blocks. However, the previously encoded or decoded projection samples for the one or more neighbor blocks might not clearly indicate the motion within the block to be encoded or decoded. As such, in some implementations, the projection samples for estimating the warped motion of the block to be encoded or decoded can be determined using additional data, such as one or more motion vectors of the block to be encoded or decoded, in concert with the previously encoded or decoded projection samples for the one or more neighbor blocks.

In some implementations, data included in a bitstream can indicate a warping model used to encode or decode a neighbor block of the block to be encoded or decoded. The data indicating the warping model of the neighbor block can further indicate a reference frame used to encode or decode the neighbor block. Because adjacent blocks are more likely to use a common reference frame for prediction in the encoding and decoding processes, it is possible, if not likely, that a neighbor block encoded or decoded before a current block was encoded or decoded using a same reference block as the current block. As such, in some implementations, projection samples used to encode or decode the neighbor block can also be used to encode or decode the block where the block uses the same reference frame as the neighbor block.

For example, and as shown in FIG. 6, a current frame 600 includes blocks 602A, 602B, 602C, 602D, 602E, and 602F. Block 602F is a current block to be encoded and includes some warped motion. Block 602D is a previously encoded neighbor block that includes pixel motion at 604. Block 602E is another previously encoded neighbor block that includes pixel motion at 606. Block 602A is another previously encode neighbor block that includes pixel motion at 608. In some implementations, the pixel motion shown at 604, 606, 608, or any combination, represents projection samples showing how the pixels of the respective blocks moved responsive to warped motion compensation. For example, with respect to the block 602A, a pre-prediction position of a pixel is shown at the location where the arrow originates, and a post-prediction position of the pixel is shown at the location where the arrow terminates.

A bitstream including data corresponding to the current frame 600 includes information about the warping models used to encode the blocks 602A, 602D, and 602E. On a condition that the prediction of those blocks used a common reference frame as the block 602F, the warping models of the blocks 602A, 602D, and 602E, and therefore the projection samples represented by the motion 604, 606, and 608 can be used to determine a warping model of the block 602F. In some implementations, the pixel position coordinates of the projection samples within the current frame 600 are projected to the common reference frame to identify a non-rectangular warped patch to be used to generate a prediction block for encoding the block 602F. A method for generating a prediction block using such projection samples is discussed with respect to FIG. 8.

In some implementations, neighbor blocks of a block to be encoded or decoded might not have been encoded or decoded using warped motion compensation. In those situations, motion vectors for those neighbor blocks determined via regular motion compensation can be used as the projection samples for determining the warping model of the block to be encoded or decoded. For example, the motion 604, 606, and 608 can represent motion vectors of the blocks 602D, 602E, and 602A, respectively, relative to the reference frame. Those motion vectors can be used to predict a warped motion of the block 602F by similar projection to the reference frame as discussed above.

Figure 7:
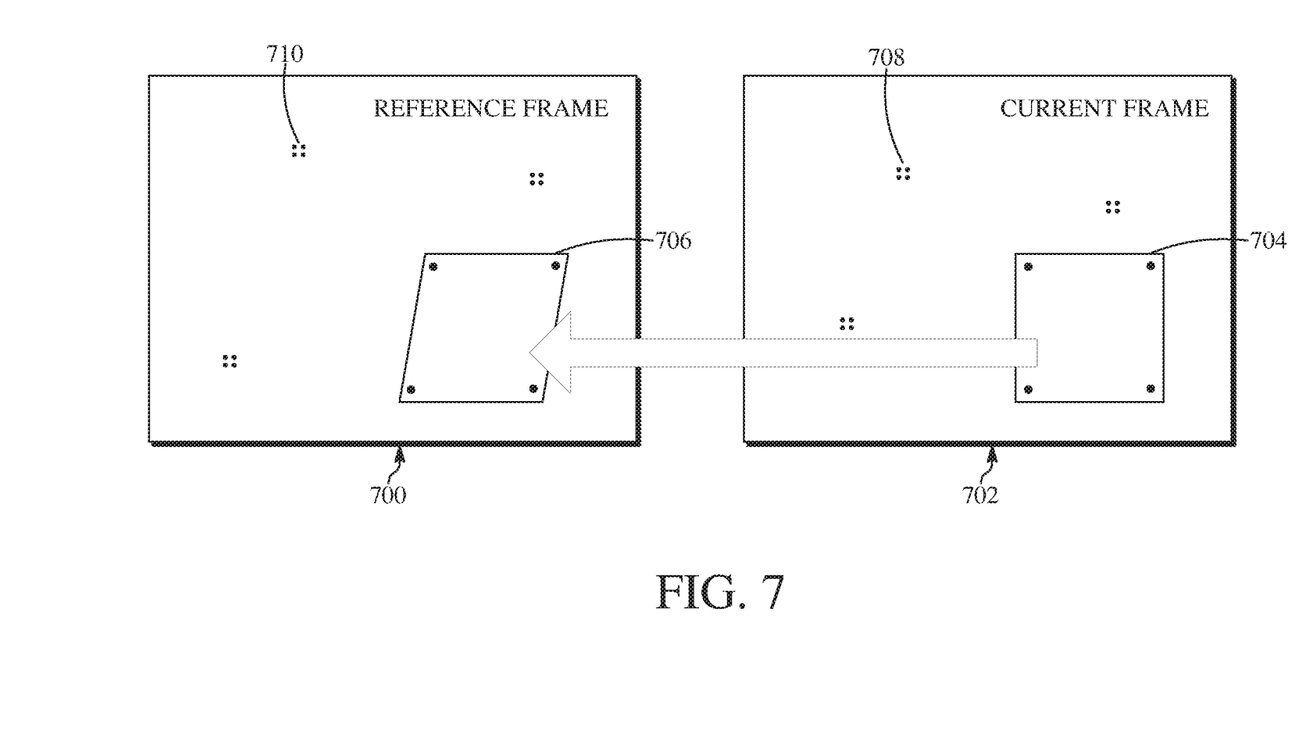
FIG. 7 is a diagram showing an example of warping a block of a video frame using models associated with a reference frame.

FIG. 7 is a diagram showing an example of warping a block of a video frame using models associated with a reference frame. A reference frame to which pixels of a current block 704 to be encoded or decoded are projected is shown at 700, and a current frame including the current block is shown at 702. The reference frame 700 includes a warped patch 706 representing how the pixels of the current block 704 are projected to the reference frame 700 based on warping models, whose parameters are estimated from projection samples from, e.g., neighbor blocks of the current block 704.

The pixels 708 within the current frame 702 represent pre-prediction positions of pixels shown in the blocks of the current frame 600 of FIG. 6, whereas the pixels 710 within the reference frame 700 represent corresponding post-prediction positions of those pixels. As such, projection samples can be determined based on the pixels 708 and 710. The pixels of the current block 704 are projected to the warped patch 706 based on the projection samples determined using the neighbor blocks of the current block 704 (not shown in FIG. 7).

The warped patch 706 can be used to generate a prediction block for encoding or decoding the current block 704. The pixels of the current block 704 are projected to the warped patch 706 using a projection model indicating how the pixels are to be scaled, rotated, or otherwise moved when projected into the reference frame 700. In some implementations, the projection model to use can be indicated by data associated with the neighbor blocks within an encoded bitstream. The projection samples determined using the neighbor blocks of the current block 704 can be used to determine parameters of the projection model. The number and function of the parameters depend upon the specific projection model to be used. For example, where the projection model is a homographic projection model, eight parameters can be used to show how pixel positions within the current block 704 scale or translate amongst the x- or y-axes. The specific projection model used further determines a possible shape of the warped patch 706. For example, because eight parameters are used with the homographic projection model to represent the x- and y-coordinates of four pixels of the current block 704, the warped patch 706 that corresponds to the current block 704 can be any non-rectangular quadrilateral. However, where an affine projection model is used including six parameters, linearity of the pixel projection is preserved such that the warped patch 706 that results can be any non-rectangular parallelogram, but not any non-rectangular quadrilateral. The warped patch may also be referred to as a warped prediction block herein.

Figure 8:
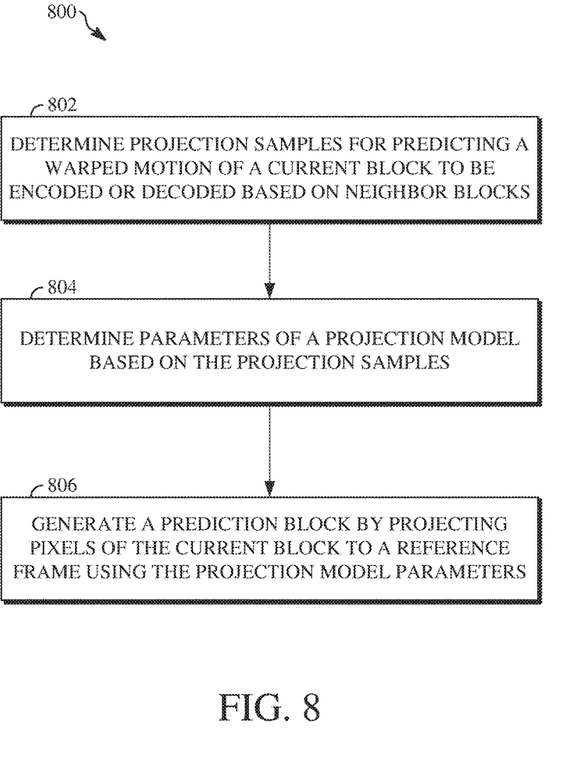
FIG. 8 is a flowchart diagram of a process for generating a prediction block to encode or decode a frame using warped motion compensation.

FIG. 8 is a flowchart diagram of a process 800 for generating a prediction block to encode or decode a frame using warped motion compensation. The process 800 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

At 802, projection samples used to predict a warped motion of a current block to be encoded or decoded are determined. The projection samples are determined based on data associated with neighbor blocks adjacent to the current block that are encoded or decoded before the current block. The projection samples are used to predict a warping model for the current block, wherein the warping model indicates a specific location within a reference frame to which to project the current block, for example, by indicating how to stretch, zoom, rotate, or otherwise manipulate pixels of the current block. The data associated with a neighbor block and used to determine the projection samples can include a warping model indicating how pixels of the neighbor block were warped to generate a prediction block for encoding or decoding the neighbor block. In some implementations, data indicative of the warping model associated with a neighbor block is identified within a bitstream including encoded video data for the neighbor block. The data indicative of the warping model can be stored in a buffer accessible by an encoder or decoder rather than being included in the bitstream.

In some implementations, the neighbor block is encoded or decoded using a same reference frame as the reference frame being used to encode or decode the current block. The warping model for the neighbor block can thus indicate the common reference frame. In this situation, one or more pixels corresponding to the pixels of the neighbor block can be selected from the reference frame. The projection samples to be used for predicting a warped motion of the current block can thus be determined based on motion vectors corresponding to the selected pixels of the reference frame. In some implementations, the motion vectors corresponding to the selected pixels of the reference frame are determined based on the locations of the selected pixels of the reference frame and the corresponding pixels of the neighbor block. The projection samples to be used for predicting the warped motion of the current block may also be determined based on motion vectors corresponding to reference frame pixels that corresponding to the pixels of multiple neighbor blocks.

In some implementations, the projection samples used for predicting a warped motion of the current block are determined based on a size of a neighbor block and the efficiency of the warping model used to encode or decode the neighbor block. For example, the warped motion of the current block can be predicted using a weighted average of projection samples from one or more neighbor blocks. The size of a neighbor block can correlate with a degree to which projection samples for the neighbor block influence the average, as a larger number of projection samples can be indicative of a more precise warping model. That is, because a larger neighbor block typically includes a larger number of projection samples than a smaller neighbor block, projection samples from larger neighbor blocks can be given a larger weight when calculating the weighted average than projection samples from smaller neighbor blocks. Separately, the quantized residuals for a neighbor block can indicate an efficiency of the warping model of the neighbor block. For example, smaller values of quantized residuals can indicate a higher precision of a corresponding warping model, and so portions of a neighbor block having quantized residuals with small values can be selected to improve the efficiency of the neighbor block for determining the projection samples for the current block.

As mentioned briefly above, one or more neighbor blocks may not be encoded or decoded using warped motion compensation, such that the prediction of those neighbor blocks is performed using regular motion compensation. As such, the warping model of a neighbor block may indicate a motion vector for the neighbor block. The motion vector of the neighbor block can then be used to determine the projection samples for predicting the warped motion of the current block. In some implementations, the projection samples to be used for predicting the warped motion of the current block are determined based on motion vectors from multiple neighbor blocks encoded or decoded using regular motion compensation.

In some implementations, the projection samples to be used for predicting the warped motion of the current block are determined based on a combination of motion vectors from neighbor blocks encoded or decoded using regular motion compensation and selected reference frame pixels corresponding to pixels of neighbor blocks encoded or decoded using warped motion compensation, for example, where the warping model of respective neighbor blocks does not accurately project the pixels of the current block to the reference frame (e.g., because the projection samples determined by those neighbor blocks do not give a full view of the warping motion of the current block). Where the projection samples determined from neighbor blocks encoded or decoded using warped motion compensation are too expensive, motion vector data can be used to determine projection samples for predicting the warping model of the current block to reduce the total cost. For example, if the projection samples determined based on warped motion compensation use more than a threshold amount of memory to be encoded to a bitstream or otherwise communicated for use by other blocks, motion vectors can be used to reduce the overall cost by estimating portions of the projection samples.

At 804, parameters of a projection model are determined based on the projection samples determined at 802. The projection model is a parametric model used to project the pixels of the current block to a portion of a reference frame based on the warped motion predicted using the determined projection samples. In some implementations, the projection model is an affine projection model, a homographic projection model, a rotation-zoom projection model, an interpolation projection model, or the like.

Different projection models can use a different number of parameters to facilitate the projection. For example, an affine projection model can use six parameters to project the pixels of the current block to the reference frame according to the warped motion predicted using the determined projection samples. Generally speaking, an affine projection is a linear transformation between the coordinates of two spaces defined by the six parameters. The affine projection between two spaces is defined as follows:

$$x = a*X + b*Y + c; \text{ and}$$

$$y = d*X + e*Y + f.$$

In these equations, (x, y) and (X, Y) are coordinates of two spaces, namely, a position of a pixel within the reference frame and a position of a pixel within the frame including the current block, respectively. Also, a, b, c, d, e, and f are affine parameters and are real numbers representing a relationship between positions of respective pixels within the reference frame and the frame including the current block. Of these, a and d represent rotational or scaling factors along the x-axis, b and e represent rotational or scaling factors along the y-axis, and c and f respectively represent translation along the x- and y-axes. In that the affine projection model follows a linear transformation, a warped patch to which the pixels of the current block are projected using an affine projection model can be a parallelogram.

In another example, a homographic projection model can use eight parameters to project the pixels of the current block to the reference frame according to the warped motion predicted using the determined projection samples. A homographic projection model is not bound by a linear transformation between the coordinates of two spaces, such that the eight parameters that define a homographic projection can be used to project pixels of a current block to any quadrilateral patch within a reference frame. The homographic projection between two spaces is defined as follows:

$$x = \frac{a*X + b*Y + c}{g*X + h*Y + 1}; \text{ and}$$

$$y = \frac{d*X + e*Y + f}{g*X + h*Y + 1}.$$

In these equations, (x, y) and (X, Y) are coordinates of two spaces, namely, a position of a pixel within the reference frame and a position of a pixel within the frame including the current block, respectively. Further, a, b, c, d, e, f, g, and h are the homographic parameters and are real numbers representing a relationship between positions of respective pixels within the reference frame and the frame including the current block. Of these parameters, a represents a fixed scale factor along the x-axis with the scale of the y-axis remaining unchanged, b represents a scale factor along the x-axis proportional to the y-distance to a center point of the block, c represents a translation along the x-axis, d represents a scale factor along the y-axis proportional to the x-distance to the center point of the block, e represents a fixed scale factor along the y-axis with the scale of the x-axis remaining unchanged, f represents a translation along the y-axis, g represents a proportional scale of factors of the x- and y-axes according to a function of the x-axis, and h represents a proportional scale of factors of the x- and y-axes according to a function of the y-axis.

The values of the parameters for a projection model are determined based on the projection samples determined at 802. In some implementations, the values of the parameters are determined by adding corresponding values of motion vectors of the current block to the projection samples determined using the neighbor blocks.

The projection model to use for projecting the pixels of the current block to the reference frame can be selected based on a projection model used by the one or more neighbor blocks used to determine the projection samples at 802. For example, where most or all of the neighbor blocks are encoded or decoded using a common projection model, the common projection model can be selected as the projection model used to encode or decode the current block. In some implementations, the projection models used to encode or decode respective neighbor blocks is indicated within the encoded bitstream. Alternatively, the projection models can be stored in a buffer accessible by an encoder or decoder rather than being included in the bitstream. In this example, the projection models may be estimated using a plurality of warping models or projection parameters associated with neighbor blocks of the current block. The estimation can indicate parameters usable to generate a least mean square error between actual projection locations for respective pixels and the projections of the estimated projection models. For example, the parameters can be averaged from the projection parameters associated with the neighbor blocks used for the estimating. The model parameters are thus not necessarily transmitted in the bitstream because the encoder and decoder can do the estimation.

At 806, a prediction block is generated using the parameters of the projection model determined at 804. Pixels of the current block to be encoded or decoded are projected to a warped patch in a reference frame using the parameters of the projection model. Before the projection, respective pixels of the current block are arranged in generally rectangular geometries. Responsive to the projection, the respective pixels of the current block are warped to correspond to a geometry of the warped patch in the reference frame.

In some implementations, the pixels of the current block are projected to the warped patch according to the projection model discussed at 804. The parameters for the projection model are determined based on the projection samples determined at 802 such that coordinates to which to project pixels of the current block within the reference frame can be determined. The warped patch of the reference frame can be a parallelogram or other non-rectangular quadrilateral, depending on the projection model and corresponding parameter values used.

The warped patch can then be unwarped to return the current block to a rectangular geometry suitable for predicting the current block. For example, unwarping the projected pixels of the warped patch after respective pixels are projected to the warped patch of the reference frame can include projecting the warped patch to a rectangular block. The pixel position coordinates of the warped patch of the reference frame can be projected to the rectangular block based on respective coordinate translations to the rectangular block. The resulting rectangular block can then be used as the prediction block for encoding or decoding the current block.

In another example, pixel values at positions of the warped patch can be copied to corresponding positions within a rectangular block usable for predicting the current block. The pixel values of the warped patch can be copied from the reference frame into the rectangular block using an intermediary buffer. Where the copied pixel values of the warped patch are not represented using integers, pixel interpolation may be used to determine integer values for the copied pixel values (e.g., by approximating the pixel values at subpixel locations).

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

In an implementation, the process 800 can additionally include an operation for generating an alternate prediction block and performing a rate-distortion analysis to select one of the prediction block or the alternate prediction block as a final prediction block for encoding or decoding the current block. For example, the alternate prediction block can be generated based on a non-warped motion compensation. In this case, the alternate prediction block can be generated using regular motion compensation based on motion vectors for respective pixels of the current block. Alternatively, the alternate prediction block can be generated using a warping model different from the warping model used to determine the projection samples for predicting the warped motion of the current block. In another alternative, the alternate prediction block can be generated using an alternate projection model different from the projection model used based on the determined projection samples. According to the teachings herein, multiple candidate alternate prediction blocks can be generated such that the final prediction block used to encode or decode the current block is selected from the prediction block and the multiple candidate alternate prediction blocks. In some cases, different candidate alternate prediction blocks can be generated based on different reference frames. The rate-distortion analysis to select the final prediction block can be performed by comparing the rate-distortion values for respective candidate prediction blocks such that the final prediction block is selected as the candidate prediction block having the lowest rate-distortion value.

In another example, the process 800 additionally includes one or more operations for encoding or decoding the current block using a prediction block. In some implementations, encoding the current block using the prediction block includes transforming the values for the pixels of the prediction block, quantizing the transformed pixel values, entropy encoding the quantized pixel values, and encoding the entropy encoded pixel values to generate an encoded bitstream. Decoding the current block using the prediction block can include entropy decoding pixel values for the encoded current block received from an encoded bitstream, dequantizing the entropy decoded pixel values, inverse transforming the dequantized pixel values, and reconstructing the current block using the prediction block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a current block of an encoded video frame, the encoded video frame included in an encoded bitstream, the apparatus comprising:
a processor configured to execute instructions stored in a non-transitory storage medium to:
determine projection samples for predicting a non-linear motion of pixels of the current block based on a warping model of a previously decoded neighbor block adjacent to the current block within the encoded video frame, the non-linear motion representing at least one of a scaling or a rotation of the pixels of the current block, the warping model of the previously decoded neighbor block representing a non-linear motion of pixels of the previously decoded neighbor block;
determine parameters of a projection model for the current block by applying the projection samples to a parameterized projection model used to decode the previously decoded neighbor block;
generate a prediction block by projecting pixels of the current block to a warped patch within a reference frame using the parameters of the projection model, the warped patch being a non-rectangular patch having a shape and a position in the reference frame indicated by the parameters of the projection model;
reconstruct the current block using the prediction block; and
output the reconstructed current block to an output video stream.

2. The apparatus of claim 1, wherein the processor is configured to execute instructions stored in the non-transitory storage medium to determine the projection samples for predicting the non-linear motion of the pixels of the current block based on the warping model of the previously decoded neighbor block by:
on a condition that the neighbor block was decoded using the reference frame, selecting one or more pixels of the reference frame corresponding to pixels of the neighbor block, the pixels associated with the warping model; and
determining the projection samples based on motion vectors corresponding to the one or more pixels.

3. The apparatus of claim 1, wherein the neighbor block comprises at least a first neighbor block and a second neighbor block, the warping model comprises at least a first warping model associated with the first neighbor block and a second warping model associated with the second neighbor block, and the processor is configured to execute instructions stored in the non-transitory storage medium to determine the projection samples for predicting the non-linear motion of the pixels of the current block based on the warping model of the previously decoded neighbor block by:
determining a set of projection samples for the first neighbor block and a second neighbor block based on a respective size of the first neighbor block and the second neighbor block, and a respective efficiency of the first warping model and the second warping model; and
determining the projection samples for predicting the non-linear motion of the pixels of the current block based on the set of projection samples determined for the first neighbor block and the second neighbor block.

4. The apparatus of claim 1, wherein the processor is configured to execute instructions stored in the non-transitory storage medium to determine the parameters of the projection model by:
determining the parameters of the projection model based on the projection samples and one or more motion vectors of the current block by adding corresponding values of the one or more motion vectors of the current block to a set of motion vectors indicated by the projection samples.

5. The apparatus of claim 1, wherein the processor is configured to execute instructions stored in the non-transitory storage medium to generate the prediction block by:

generating a warped prediction block by using the parameters of the projection model to project pixels of the current block to locations of the warped patch in the reference frame; and generating the prediction block by unwarping the warped prediction block into a rectangular block usable for decoding the current block.

6. The apparatus of claim 1, wherein the processor is configured to execute instructions stored in the non-transitory storage medium to reconstruct the current block using the prediction block by:

selecting, as a final prediction block for decoding the current block, one of the prediction block and an alternate prediction block based on a rate-distortion analysis; and reconstructing the current block using the final prediction block, wherein the alternate prediction block is generated based on at least one of a non-warped motion compensation, an alternate warping model, or an alternate projection model.

7. A method for decoding a current block of an encoded video frame, the encoded video frame included in an encoded bitstream, the method comprising:

determining projection samples for predicting a non-linear motion of pixels of the current block based on a warping model of a previously decoded neighbor block adjacent to the current block within the encoded video frame, the non-linear motion representing at least one of a scaling or a rotation of the pixels of the current block, the warping model of the previously decoded neighbor block representing a non-linear motion of pixels of the previously decoded neighbor block;

determining parameters of a projection model for the current block by applying the projection samples to a parameterized projection model used to decode the previously decoded neighbor block;

generating a prediction block by projecting pixels of the current block to a warped patch within a reference frame using the parameters of the projection model, the warped patch being a non-rectangular patch having a shape and a position in the reference frame indicated by the parameters of the projection mode;

reconstructing the current block using the prediction block; and outputting the reconstructed current block to an output video stream.

8. The method of claim 7, wherein determining the projection samples for predicting the non-linear motion of the pixels of the current block based on the warping model of the previously decoded neighbor block comprises:

on a condition that the neighbor block was decoded using the reference frame, selecting one or more pixels of the reference frame corresponding to pixels of the neighbor block, the pixels associated with the warping model; and determining the projection samples based on motion vectors corresponding to the one or more pixels.

9. The method of claim 7, wherein the neighbor block comprises at least a first neighbor block and a second neighbor block, the warping model comprises at least a first warping model associated with a first neighbor block and a second warping model associated with a second neighbor block, and determining the projection samples for predicting the non-linear motion of the pixels of the current block based on the warping model of the previously decoded neighbor block comprises:

determining a set of projection samples for the first neighbor block and the second neighbor block based on a respective size of the first neighbor block and a size of the second neighbor block, and based on a respective efficiency of the first warping model and the second warping model; and determining the projection samples for predicting the non-linear motion of the pixels of the current block based on the set of projection samples determined for the first neighbor block and the second neighbor block.

10. The method of claim 7, wherein generating the prediction block comprises:

generating a warped prediction block by using the parameters of the projection model to project pixels of the current block to locations of the warped patch in the reference frame; and generating the prediction block by unwarping the warped prediction block into a rectangular block usable for decoding the current block.

11. The method of claim 7, wherein reconstructing the current block using the prediction block comprises:

selecting, as a final prediction block for decoding the current block, one of the prediction block and an alternate prediction block based on a rate-distortion analysis; and reconstructing the current block using the final prediction block, wherein the alternate prediction block is generated based on at least one of a non-warped motion compensation, an alternate warping model, or an alternate projection model.

12. A non-transitory computer-readable storage medium comprising processor-executable routines that, when executed by a processor, facilitate a performance of operations for decoding a current block of an encoded video frame, the encoded video frame included in an encoded bitstream, the operations comprising:

determining projection samples for predicting a non-linear motion of pixels of the current block based on a warping model of a previously decoded neighbor block adjacent to the current block within the encoded video frame, the non-linear motion representing at least one of a scaling or a rotation of the pixels of the current block, the warping model of the previously decoded neighbor block representing a non-linear motion of pixels of the previously decoded neighbor block;

determining parameters of a projection model for the current block by applying the projection samples to a parameterized projection model used to decode the previously decoded neighbor block;

generating a prediction block by projecting pixels of the current block to a warped patch within a reference frame using the parameters of the projection model, the warped patch being a non-rectangular patch having a shape and a position in the reference frame indicated by the parameters of the projection model;

reconstructing the current block using the prediction block; and outputting the reconstructed current block to an output video stream.

13. The non-transitory computer-readable storage medium of claim 12, wherein the operations for determining the projection samples for predicting the non-linear motion of the pixels of the current block based on the warping model of the previously decoded neighbor block comprise:

on a condition that the neighbor block was decoded using the reference frame, selecting one or more pixels of the reference frame corresponding to pixels of the neighbor block, the pixels associated with the warping model; and determining the projection samples based on motion vectors corresponding to the one or more pixels.

14. The non-transitory computer-readable storage medium of claim 12, wherein the neighbor block comprises at least a first neighbor block and a second neighbor block, the warping model comprises at least a first warping model associated with the first neighbor block and a second warping model associated with the second neighbor block, and the operations for determining the projection samples for predicting the non-linear motion of the pixels of the current block based on the warping model of the previously decoded neighbor block comprise:

determining a set of projection samples for the first neighbor block and a second neighbor block based on a respective size of the first neighbor block and the second neighbor block, and a respective efficiency of the first warping model and the second warping model; and determining the projection samples for predicting the non-linear motion of the pixels of the current block based on the set of projection samples determined for the first neighbor block and the second neighbor block.

15. The non-transitory computer-readable storage medium of claim 12, wherein the operations for determining the parameters of the projection model comprise:

determining the parameters of the projection model based on the projection samples and one or more motion vectors of the current block by adding corresponding values of the one or more motion vectors of the current block to a set of motion vectors indicated by the projection samples.

16. The non-transitory computer-readable storage medium of claim 12, wherein the operations for generating the prediction block comprise:

generating a warped prediction block by using the parameters of the projection model to project pixels of the current block to locations of the warped patch in the reference frame; and generating the prediction block by unwarping the warped prediction block into a rectangular block usable for decoding the current block.

17. The non-transitory computer-readable storage medium of claim 12, wherein the operations for reconstructing the current block using the prediction block comprise:

selecting, as a final prediction block for decoding the current block, one of the prediction block and an alternate prediction block based on a rate-distortion analysis; and reconstructing the current block using the final prediction block, wherein the alternate prediction block is generated based on at least one of a non-warped motion compensation, an alternate warping model, or an alternate projection model.

* * * * *